United States Patent

[11] 3,593,167

[72] Inventor Michael A. Koulopoulos
Watertown, Mass.

[21] Appl. No. 794,576
[22] Filed Jan. 28, 1969
[45] Patented July 13, 1971
[73] Assignee Honeywell, Inc.
Minneapolis, Minn.

[54] SYNCHRONOUS READ CLOCK APPARATUS
9 Claims, 2 Drawing Figs.

[52] U.S. Cl. .................... 328/155, 328/74, 328/133, 331/17, 331/25, 331/36
[51] Int. Cl. .................... H03b 3/04
[50] Field of Search .................... 328/74, 75, 133, 155; 331/17, 16, 25, 36

[56] References Cited

UNITED STATES PATENTS

| | | | |
|---|---|---|---|
| 2,856,529 | 10/1958 | Mielke | 331/36 X |
| 2,935,609 | 5/1960 | Rabin et al | 328/133 X |
| 3,286,188 | 11/1966 | Castellano, Jr. | 328/155 X |
| 3,308,387 | 3/1967 | Hackett | 328/155 |
| 3,328,719 | 6/1967 | De Lisle et al | 331/17 |
| 3,337,814 | 8/1967 | Brase et al | 331/18 |
| 3,488,605 | 1/1970 | Schwartz | 331/17 |

*Primary Examiner*—Donald D. Forrer
*Assistant Examiner*—R. C. Woodbridge
*Attorneys*—Fred Jacob and Leo Stanger

ABSTRACT: A self-synchronizing read clock apparatus receives from a random access memory an encoded information pulse train consisting of data and synch pulses, and applies it across a normally inactive resonant tank circuit. The tank circuit generates a periodic sinusoidal reference signal, and a detection circuitry derives a reference timing train from reference points of the sinusoidal reference signal. The apparatus includes circuitry which delays the input data train to coincide with other reference points of the same reference signal and, further, has circuitry for generating an error voltage whose magnitude is proportional to the discrepancy in phase between the data train and reference signal and applies a correction voltage to the tank which adjusts the frequency to decrease the discrepancy in phase at a critically damped rate.

INVENTOR
MICHAEL A. KOULOPOULOS
BY Faith F. Driscoll
AGENT

INVENTOR
MICHAEL A. KOULOPOULOS

BY Keith F. Driscoll

AGENT

SYNCHRONOUS READ CLOCK APPARATUS

BACKGROUND OF THE INVENTION

This invention concerns timing apparatus for decoding digital information read from a memory device. Specifically, the invention provides a new synchronous read clock for facilitating the decoding of data pulses recorded with synchronizing pulses on a magnetic storage medium.

The new read clock provides reliable and accurate operation, and hence reduces to a minimal level the introduction of errors in the decoding of recorded digital information. Further, the read clock requires relatively few components, can be manufactured at low cost, has few adjustment controls, and is readily maintained and easily adjusted for optimum performance.

Self-clocking recording is known in which digital information is recorded encoded with synchronizing pulses, and the synchronizing pulses are used in decoding the recorded data upon read out from the memory. See for example A. S. Hoagland, "Digital Magnetic Recording," John Wiley and Sons, Inc. 1963, PP 130—132; and W. W. Chu, "Computer Simulation of Waveform Distortions in Digital Magnetic Recordings," IEEE Transactions on Electronic Computers, Volume EC-15, Number 3, June 1966, PP 328 ff.

With one self-clocking technique, termed double frequency recording, a synchronizing pulse is recorded during every bit interval and a data pulse is recorded or not in that interval depending upon the binary value of the data bit, i.e. a binary ONE is represented by the presence of a data pulse and a binary ZERO by the absence of a data pulse. To facilitate readout, maximum separation, i.e. one-half the bit interval, is desired between bits. This results in a synch pulse at the beginning of every bit interval and a data pulse at midpoint of each bit interval.

Normally, the readout process of double frequency recorded signals requires identification of these signals as either synch or data pulses and the separation of data pulses from the synch pulses. Accordingly, the recovery circuit checks for the presence of pulses during the bit interval, i.e. between synch pulses. Consequently, successful recovery of information from the recorded signal depends in part upon the ability of the equipment to distinguish between the long and short time intervals. This separation of the data pulses from the synch pulses is conventionally done with decoding equipment under the timing control of timing pulses from a read clock.

However, it is known that the data train, i.e. the succession of synch and data pulses, readout from a self-clocking recording undergoes several kinds of timing disturbances. Principal timing disturbances are a bit shift of the synch pulses due to pulse crowding effects and a shift in data pulses as a consequence of a variety of effects which include inaccuracies in read/write circuit components, transducer tolerances, etc. For further discussion, reference may be made to the aforementioned Chu article. These timing disturbances displace the synch and data pulses from their nominal positions in the data train and can result in erroneous decoding, i.e. can result in spurious generation of a data bit, and alternatively, in the failure to respond to a data pulse.

A further disadvantage of this type of arrangement is that the oscillator drifts in frequency when operated over long periods of time. Because of this, the time to synchronize the oscillator with a reference frequency becomes unpredictable and exceedingly long. Consequently, in magnetic recording systems where synchronization of a read clock is achieved by recording a number of synchronization pulses prior to each data record, a larger number of synchronization pulses would have to proceed the record in order to allow for frequency drift conditions in the oscillator frequency.

To overcome these timing disturbances in the data train, efforts have been made to provide read clocks responsive to the synch pulses of a data train to generate timing pulses at a fixed phase relative to the data train. In general, these read clocks have been relatively complex, costly, and of limited reliability and accuracy. Further, precise adjustment has been difficult. One specific prior construction is that of a read clock having a free-running oscillator establishing a reference frequency and adjustable to accommodate an average bit shift. Others have provided separate circuitry for adjusting the frequency and phase of the output pulses of a read clock.

Aside from the problem maintaining a stable frequency, such clocks generate timing pulses without regard to whether an input train of data and synch pulses is being received. The resultant presence of timing signals when no data train is present can cause the decoding equipment to produce logical signals indicating that a train of binary ZERO data pulses is present, which is an error condition.

Another prior art solution corrects only long term frequency variations by employing, in connection with a clock, a number of integrator circuits connected in series and characterized by different time constants for establishing minimum and maximum frequency variations. In addition to being complex, this arrangement has been found difficult to adjust, especially where a single read clock is used for recovering data from a recording medium such as a magnetic disc having plural track at different radical positions and hence having a number of minimum and maximum variations as well as short term variations.

Accordingly, it is an object of the present invention to provide clocking apparatus for self-clocking memory systems and capable of accurate operation with both rapid and large timing disturbances. It is also an object to provide such clocking apparatus that operates with high accuracy and with high reliability.

It is a further object of the invention to provide improved apparatus for recovering information, recorded with a double frequency recording technique, by generating a timing train which maintains a predetermined phase relative to the data and synch pulses of the data train, notwithstanding a shifting in both the phase and frequency of the pulses of the data train.

It is a further object to provide apparatus of the above character which automatically inhibits the generation of timing signals in the absence of a successive number of pulses read out from a storage medium.

It is another object to provide clocking apparatus of the above character which automatically inhibits the generation of timing signals when the phase of the data train departs from a reference value by more than a selected amount.

It is a still further object to provide low cost clocking apparatus for producing a reference signal that can be adjusted automatically in both frequency and phase relative to the pulses of a data train at a desired correction rate.

A further object is to provide a reliable and accurate read clock which has relatively few components and is capable of manufacture at low cost for use in self-timing memory systems.

Other objects of the invention will in part be obvious and will in part appear hereinafter.

SUMMARY OF THE INVENTION

Consider briefly, the present invention provides a read clock having an oscillatory circuit that is "normally-inactive," in that it operates only when externally excited as by the synch and data pulses in the data train produced upon reading out from a self-clocking memory system. The read clock electronically adjusts the frequency of the oscillatory circuit in proportion to the difference in phase between the resonant reference signal which the clock produces and the pulses of the data train. As a result, the timing signal output from the clock consistently has a nearly fixed relation to the timing pulses in the data train. This fixed timing relation results in highly accurate decoding of the data train. As also described below, the read clock is constructed to adjust the oscillatory circuit in this manner at a critically damped rate.

A feature of the read clock is that it automatically stops producing timing pulses when a predetermined number of pulses are missing in succession from the input data train. Additionally, the read clock automatically stops producing timing pulses when the pulses of the data train are offset from a nominal value beyond a maximum amount. Both an absence of a successive number of pulses and an excessive timing departure generally are normally associated with major faults in the self-clocking memory system. Hence, this operation in both instances precludes the readout system from attempting to decode an erroneous data train, which most likely would result in erroneous output data.

The invention accordingly comprises the features of construction, combination of elements and arrangement of parts exemplified in the construction hereinafter set forth, and the scope of the invention is indicated in the claims.

DESCRIPTION OF THE DRAWINGS

For a fuller understanding of the nature and objects of the invention, reference should be had to the following detailed description taken in connection with the accompanying drawings, in which.

DESCRIPTION OF THE ILLUSTRATED EMBODIMENT

Figure 1:
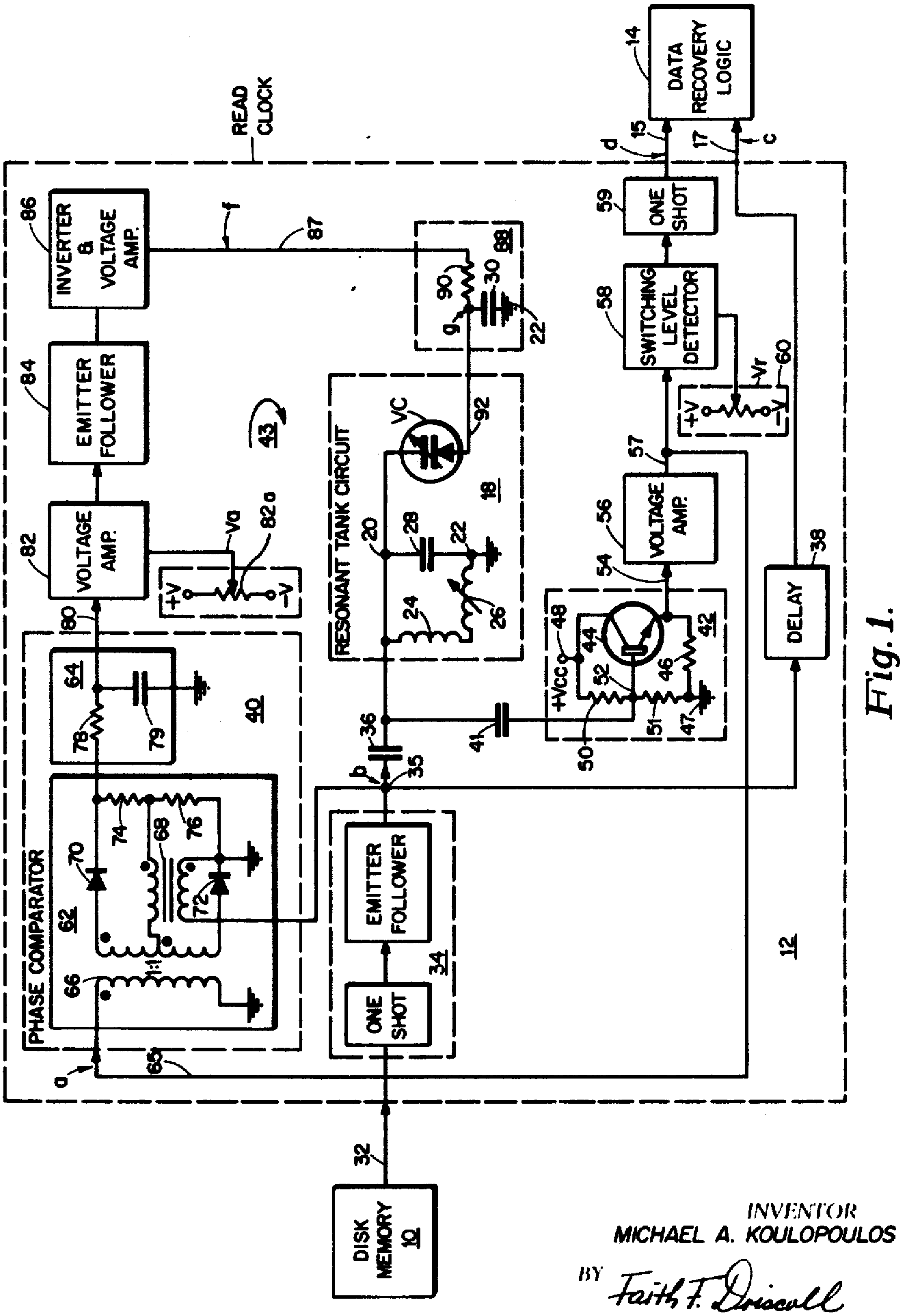
FIG. 1 is a simplified block and line diagram of a disc memory and control unit including the self-clocking apparatus of the invention.

With reference to FIG. 1, the invention is described in relation to a magnetic disc memory 10 which conventionally has a number of magnetic recording discs and includes an accessing mechanism having read/write circuitry for reading and writing data in any track on each disc. The illustrated memory 10 records information with the double frequency recording technique discussed above.

The memory 10 also includes conventional circuitry (not shown) for converting the analog signal sensed by the read circuit into a digital signal. The resultant digital signal produced from reading a disc of the memory 10, and herein referred to as the data train, is a digital self-clocking signal consisting of synch pulses and data pulses.

A line 32 applies the data train to a memory control unit having a read clock 12 and data recovery logic 14. Other logic circuits not pertinent to the invention may be associated with the memory 10 and the control unit.

The read clock 12 receives the input train on the line 32, applies it to shaping and impedance matching circuitry 34, and delays it with a delay mechanism 38 before applying it to the data recovery logic 14 on line 17. Concurrently, the read clock 12 generates a timing train, i.e. a succession of timing pulses, in response to the data train, and applies it to the data recovery logic on line 15. The pulses of the timing train nominally have a uniform prescribed phase relative to the data and synch pulses of the data train.

The data recovery logic 14 decodes the data train at times determined by the timing pulses from the clock. Accordingly, precise and accurate data recovery require that the pulses of the data train consistently have a known phase relative to the timing pulses.

For this purpose, whenever the clock 12 detects a change in the phase or frequency of the data train pulses, it adjusts the phase of the timing pulses to reserve the specified phase relation between the pulses of the two pulse trains.

In brief, as shown in FIG. 1, the read clock 12 excites a resonant tank circuit 18 included therein with the pulses of the data train subsequent to reshaping by the shaping and matching circuit 34. The resonant reference signal from the tank circuit is then processed in stages 42, 56, 58 and 59 to produce the timing train that is applied to the recovery logic 14.

Also, in the clock 12, a phase comparator 40 in a loop 43 compares the output from the shaping and matching circuit 34 with the reference signal from the tank circuit, after amplification in stages 42 and 56. The magnitude and sense of the comparator output signal thus corresponds to the deviation of the phase of the data train at each instant of time from the phase of that train as manifested in the resonant signal.

The clock 12 applies the comparator output signal to the tank circuit to adjust the frequency of the reference signal, and hence adjust the timing pulses, so as to maintain the desired phase relation between the two pulse trains and thereby maintain precise data recovery. More specifically, the clock 12 applies the comparator output signal through stages 82, 84, 86 and 90 to voltage-controlled reactance, illustrated as the capacitance of a varactor VC that is part of the resonant tank circuit. As a result, the varactor capacitance, and hence the circuit resonant frequency, changes in accordance with the comparator signal and hence with the phase of the input train.

Also, with reference to FIG. 1, a reference signal operates a detector 58 that generates the clocking train from reference points of the reference signal. Delay means delay the pulses of the data train to have their leading edges coincide with further reference points of the reference signal. Through this uniform phase relationship, a maximum separation between the pulses of the data train and the clocking train is established at the nominal operating frequency.

By generating the reference signal, and hence the clocking train, from directly applying the data train to the resonant circuit, the clocking train is automatically inhibited in the absence of a predetermined number of pulses in succession from the data train. Also, the clocking apparatus automatically terminates the generation of an output when the phase displacement between the data train pulses and the reference signal exceeds a maximum value. Moreover, the problem of frequency drift characteristic of the prior art free running oscillator arrangement is eliminated as the clocking apparatus operates only during the presence of input pulses.

Also, as discussed further hereinafter, synchronization with the pulses of the input train is enhanced by correcting the frequency of the resonant circuit at a critically damped rate.

Recovery Logic 14

Considering the elements of the clock 12 and data recovery logic 14 of FIG. 1 in greater detail, the data recovery logic 14 includes conventional flip-flops and delay circuits (e.g. one-shot multivibrators) interconnected to respond to pulses of the clocking train to generate control signals defining the intervals during which the data pulses of the "self clocked" input data train are to be sampled for content, i.e. decoded into binary ONES and ZEROS.

Resonant Tank 18

As indicated above, the clocking train is derived from a periodic sinusoidal reference signal generated by the LC resonant tank circuit 18. The tank has three branches, all of which are connected at one end to a junction 20 and at the other end to a common reference point 22 illustrated as ground. A first branch consists of a fixed inductor 24 in series with a variable inductor 26. A fixed capacitor 28 forms a second branch, while a third branch consists of the variable capacitance of a varactor diode VC, or simply varactor, having its cathode terminal connected to the junction 20 and its anode terminal connected in series with a capacitor 30 to the grounded reference point 22. When back-biased, the varactor diode VC has a voltage-variable capacitance whose valve decreases as the magnitude of reverse bias increases.

The varactor control voltage is applied on line 92 from an RC integrating circuit 88 which, in addition to capacitor 30, includes a series resistor 90. Capacitor 30 has a capacitance larger than the maximum capacitance attributable to the varactor VC. Consequently, the capacitance of the varactor VC together with the total inductance essentially determines the operative frequency of the tank 18. The manner in which the values of the elements of the resonant tank 18 are selected is described below.

Shaping and Impedance Circuitry 34

In the illustrated embodiment, the shaping and impedance matching circuitry 34 includes a latching one-shot in series with an emitter follower circuit. The unit functions to eliminate both variations in the amplitude and width of the pulses of the input data train appearing on line 32 before they are coupled through a capacitor 36 to junction 20 of the tank 18. The one-shot, of conventional design, is triggered by the leading edge of each pulse of the data train to produce an output pulse with a width independent of the width of the input pulse.

The emitter follower circuit, also of conventional design, provides impedance matching and current amplification. The emitter follower includes, at its output, a voltage divider for diminishing the pulse amplitudes applied across the resonant tank 18. A small capacitor 36 between the tank and the unit 34 further reduces the amplitude of the pulses that excite the tank. The capacitor 36 also substantially blocks the resonant reference signal from being coupled into the unit 34. By maintaining the amplitude of the pulses applied to the tank 18 at a low value, distortion of the tank output signal is avoided because the varactor back bias, and hence capacitance, is relatively not affected by the incoming exciting signals.

Emitter Follower 42 and Voltage Amplifier 56

A coupling capacitor 41 applies the resonant tank reference signal from junction 20 to the base of a transistor 44 in an emitter follower stage 42. The emitter of transistor 44 is connected through resistor 46 to a ground reference potential 47, and the collector connects to a positive direct current (DC) supply voltage (+Vcc.) applied to a terminal 48. Biasing resistors 50 and 51 form a voltage divider between the terminal 48 and ground, to apply a DC biasing voltage to the base of transistor 44.

A voltage amplifier stage 56 connected to the emitter of transistor 44 is of conventional design. For example, the Fairchild Semiconductor Corporation publication "uA702 A High-Gain, Wideband DC Amplifier" (Feb. 1966) describes a suitable construction for stage 56.

Switching Level Detector 58 and One-Shot 59

The signal from the voltage amplifier 56 is applied to a switching level detector 58 that can also be of conventional design, constructed for example, according to the Fairchild Semiconductor publication "uA710 C High-Speed Differential Comparator" (Jan. 1966). An adjustable input reference voltage, $Vr$, to the comparator stage is established by the adjustment of an arm of potentiometer 60 connected between a pair of direct current supply voltages (+V) and (−V). The adjustable reference voltage allows adjustment of the switching level of the switching level detector stage 58 to bring the leading edge of each timing pulse which the detector produces into coincidence with sets of reference points of the amplified sinusoidal reference waveform appearing at the input thereof.

The one-shot circuit 59 connected to the output of the switching level detector 58 is also of conventional design and establishes a desired uniform pulse width for each pulse of the timing train developed on line 15.

Phase Comparator 40

The phase comparator 40 of the loop 43 includes a balanced phase modulator 62 and an integrator 64. The balanced modulator, which compares the phase of the pulses of the data train with the reference signal generated in tank 18, has a pair of transformers 66 which respectively receive the reference signal as a carrier input waveform and the data train as a modulating waveform. A pair of diodes 70 and 72 and resistors 74 and 76 are connected to the transformers as shown. The reference signal, applied across the transformer 66 primary via lead 65, is applied to the diodes 70 and 72 with opposite phases. The data train is coupled from the transformer 68 primary to the secondary for application to the two diodes with the same phase. The output of the modulator is averaged by the integrator 64, which includes a series resistor 78 and shunt capacitor 79.

As known in the art, the balanced modulator 62 operates in the region of a zero crossing characteristic, in particular about zero crossing of the negative-going slope of the carrier waveform, here the resonant reference signal. By proper selection of the nominal back bias applied to the varactor in the tank circuit 18, the carrier waveform and modulating waveform, here the data train, are adjusted to have a phase quadrature relationship. When the two waveforms are in exact phase quadrature, the balanced modulator 66 produces an output having symmetric positive and negative periods which the integrator 64 averages out to zero. Slight shifts in the relative phases of the two signals chance the balance between the positive and negative portions of the comparator output signal so that when they are averaged, or summed, by the integrator 64, they provide positive or negative DC voltage error signals whose magnitude is proportional to the phase difference between the two signals and whose polarity indicates the direction of shift. For further details regarding the above operation, reference may be made to pages 741—742 of the text titled "Pulse, Digital and Switching Waveforms" by Millman and Taub published by McGraw Hill, copyright 1965.

The time constant of the integrating circuit 64 is selected to be shorter than the width of the data pulses at junction 35 in order to discharge the integrator capacitor 79 completely when the two input signals (i.e. carrier and modulating) are in exact phase quadrature.

Voltage Amplifier 82

The voltage amplifier 82, also part of the loop 43, includes means for inverting the polarity of the error voltage signal it receives from the phase comparator 40 on the line 80. The amplifier 82 also amplifies the inverted signal without phase shift relative to an established DC reference voltage lever, $Va$. The amplifier has a construction conventional for such operation, such as the amplifier suggested above for the voltage amplifier 56, may be employed as the amplifier 82.

The voltage $Va$ is established at the tap of a potentiometer **82*a*** having one end connected to a positive DC voltage (+V) and the other end connected to a negative DC voltage (−V). The reference level $Va$ is set to a value that biases the varactor to cause the tank circuit to generate the reference signal with a frequency that nominally maintains an exact phase quadrature relationship between the carrier and modulating waveforms.

Inverter and Amplifier 86

The last amplifier stage in the loop 43 is an inverter and amplifier stage 86 of construction conventional for a series level-shifting circuit and an inverting amplifier. For example, the level shifting circuitry may include emitter follower stages, while the inverting amplifier may be a grounded base transistor. In the illustrated embodiment, the amplifier 86 applies a negative voltage signal whose amplitude varies between −3.5 volts and −15 volts for accommodating the maximum permissible frequency change in the pulses of the data train. The amplifier output voltage is clamped not to exceed this range to avoid excessive changes in varactor capacitance and, in turn, reference frequency.

BRIEF DESCRIPTION OF OPERATION

First considering the operation of the read clock 12 briefly, the shaped data train pulses applied to line 35 are applied through capacitor 36 to shock excite the tank circuit 18. In response, the tank circuit produces an alternating sinusoidal reference signal. Initially, the negative reverse bias voltage on line 92, resulting from the setting of voltage $Va$ on potentiometer **82*a*, sets the capacitance of the varactor to a value that makes the tank 18** have resonant frequency corresponding to the period of the data input pulses.

The reference waveform is coupled through the coupling capacitor 41 to the impedance matching emitter follower stage 42. The input impedance of the emitter follower 42 is in parallel with the branches of the tank circuit 18 and therefore its magnitude in part establishes the Q (Quality factor) of the tank circuit. Accordingly, this input impedance is selected such that the resonant tank circuit 18 operates in an oscillatory or underdamped mode. These impedance calculations for stage 42 and the tank circuit for a preferred embodiment are set forth hereinafter.

The reference signal as amplified by the voltage amplifier 56 is applied to the carrier signal input line 65 of the phase comparator 40. Also, the pulses at the junction 35 are applied to the modulating signal input of the comparator 40. If the frequency of the reference signal is exactly equal to the frequency of these data train pulses, the data train pulses will bracket the zero-crossover point (i.e. be in exact phase quadrature) corresponding to the negative-going slope of the reference signal sinusoid and the comparator 40 generates a zero output voltage on line 80. On the other hand, as pointed out earlier, when the position of a data train pulse is not symmetrically positioned about the zero-crossing of the reference signal waveform, the phase comparator 40 develops a DC error voltage whose magnitude and polarity correspond to the amount and sense of the phase deviation between the reference waveform and the pulse of the data train with respect to the zero crossover point.

The voltage amplifier 82 amplifies and shifts the level of the error voltage according to the established reference level, thereby developing an amplified positive error signal. This error signal is fed to the impedance-matching emitter follower stage 84 and then to the inverter voltage amplifier 86, which inverts the essentially positive error voltage to a corresponding negative voltage for reverse biasing the varactor diode VC within a maximum and minimum range of acceptable frequency deviation. Specifically, when the frequency of the tank circuit 18 is the same as the frequency of the data train pulses, i.e. the tank circuit is operating at its nominal frequency, a predetermined negative error voltage (e.g. −6.0 volts) is applied through the integrator 88 to the varactor on line 92. The error voltage magnitude establishes the varactor capacitance to operate the tank circuit 18 at the frequency of the data train pulses.

The integrator 88 sums the error voltage on the line 87 over a time interval selected to provide a varactor-controlling voltage on line 92 which changes the varactor capacitance to correct the tank circuit frequency at a critically damped rate. The reason for selecting a critically damped correction rate is to achieve an exact quadrature relationship between the sinusoidal reference waveform and the data train pulses within a minimum number of pulse periods. If the rate of correction is too low (i.e. overdamped rate), an exact quadrature relationship may be attained only after an exceedingly large number of pulses. This can cause errors in the data recovery operation as a consequency of the read clock not adjusting its frequency in accordance with the timing fluctuations of the data train. On the other hand, where varactor correction proceeds too fast (i.e. underdamped rate), the phase quadrature relationship may not be achieved until after a number of corrections in opposite directions, thereby again giving rise to data recovery errors. Further, the critically damped correction rate makes the system relatively insensitive to noise spikes and the like. The manner of selecting a time constant for the integrator 88 for achieving the desired correction rate is described below.

Continuing on with the operation, the reference signal, in addition to being compared with the pulses of the data train as just described, is fed to the switching level detector 58, which generates timing pulses, each of which coincides with a point when the positive-going slope of the reference signal crosses the reference voltage level VR. Normally, this level is offset from ground in the negative direction to switch the detector 58 earlier in time to compensate for circuit delays, the objective being to have the leading edge of each timing pulse applied to line 15 coincide exactly with the zero crossover of the positive-going slope of the reference signal at the nominal operating frequency.

As mentioned previously, each data train pulse is delayed by the delay mechanism 38 such that the pulse leading edge coincides with the zero crossover of the negative-going slope of the reference signal. Consequently, the data and timing trains output from the read clock 12 normally are 180° out of phase, or derived for optimum decoding, i.e. data recovery.

DETAILED DESCRIPTION OF OPERATION

The operation of the FIG. 1 read clock will now be discussed with reference also to the waveforms of FIG. 2. Waveform *b* shows a typical data train, of synch and data pulses **94*a*, 94*b* . . ., after processing in stage 34** to attain fixed pulse amplitudes and fixed pulse widths.

The synch pulses S of waveform *b* define the boundaries of a bit interval or cell. In the illustrated waveforms they occur nominally at intervals of 800 nanoseconds. The data pulses D occur at the midpoint of the bit intervals (i.e. they commence 400 nanoseconds after the prior synch pulse commences and 400 nanoseconds before the next synch pulse commences). The timing intervals shown on waveform *b* indicate the maximum or worst case variations in frequency and phase of pulses of the data train for an illustrative embodiment. Specifically, the values shown contemplate a maximum frequency variation in either direction of 4 percent and a maximum phase variation of 27 percent.

As indicated previously, during recording the maximum displacement which either a synch pulse or data pulse can undergo is the situation where a synch pulse follows a data pulse but is not in turn followed by a data pulse. This results in shifting the synch pulse toward the following synch pulse due to pulse crowding effects. Another worst case condition arises when a data pulse is shifted away from the preceding synch pulse by distortion. Consequently, the maximum interval, normally 400 nanoseconds, between a data pulse and the preceding synch pulse, given the above maximum frequency and phase variations, does not exceed 490 nanoseconds. Under the same variations, the minimum interval between two adjacent synch pulses (normally 800 nanoseconds) is not less than 550 nanoseconds.

The operation of the read clock of FIG. 1 when waveform *b* is applied to the line 32 will now be considered, taking the pulses in succession. It is assumed that the resonant tank circuit 18 has been operating at its nominal frequency, producing a reference signal corresponding to waveform *a* of FIG. 2 with an amplitude M. Since the start of the first synch S pulse **94*a*** of waveform *b* is not in exact phase quadrature with respect to the first zero-crossing of waveform *a* (denoted with numeral "1"), but, rather occurs earlier in time, the phase comparator 40 produces a positive error voltage on its output line 80; this error voltage is shown at **96*a*** in waveform *e*. The error voltage is amplified, inverted and applied to line 87; the resultant error waveform *f*, which illustratively has a nominal negative reference voltage of −6 volts, accordingly has a portion **98*a* of increased negative voltage. This error voltage operates integrator 88** to apply a negative bias voltage to the varactor VC.

Hence, in response to the first synch S pulse **94*a*** of waveform *b*, the varactor receives an increasingly negative voltage, the portion **100*a*** of waveform *g*, which in turn decreases the capacitance of the varactor thereby resulting in an increase in the resonant frequency of the tank 18. A decrease in the period of waveform because of this frequency increases shifts the next (i.e. number 2) zero-crossing of the negative-going portion of the reference waveform to the left thereby compensating for the displacement of the first synch S pulse **94*a*** from its nominal position.

Since the time constant of the integrator 64 in the phase comparator 40 is relatively short compared to the period of the data train, the capacitor 79 begins discharging, thereby producing a corresponding decrease in the error voltage amplitude, waveform *e*. The capacitor 79 will be discharged completely before the arrival of the first data D pulse **94*b* in the illustrated data train. This data pulse 94b is in exact phase quadrature with the number 2 zero-crossing of the negative-going slope of the reference signal, and hence the phase comparator produces no significant error voltage on the line 80**, and once more the correction voltage (waveform *g*) applied to line 92 corresponds to a nominal reference voltage.

Summarizing the foregoing operation, the error control loop 43 responds to a shift or displacement of each synch pulse S by changing the frequency of the resonant tank circuit 18 to shift the phase of the reference signal, while providing a net reference signal frequency change of zero during the cycle of operation resulting from the synch pulse 94a.

The time delay which the FIG. 1 delay mechanism imparts to the data train (waveform *b*) appears as the time delay $\Delta t$ with which the waveform *c* pulses lag the waveform *b* pulses. This delay $\Delta t$ is equal to one-half the width of the waveform *b* pulses.

As thus delayed, the leading edge of each data pulse D of waveform *c* coincides with a negative-going zero crossover of the reference signal, waveform *a*. Further, the switching level detector 58 produces the timing train, waveform *d*, in response to the positive-going crossover points of the reference waveform *a*, and hence the timing pulses in the timing train, waveform *d*, symmetrically bracket the delayed data pulses in waveform *c*.

The read clock 12 responds in a similar manner to the next pair of synch pulses 94c and 94e which illustratively bracket a ZERO data pulse (absence of a pulse). As indicated above, pulse-crowding effects offset the synch pulse 94c to the right so that it commences later than the number 3 zero crossover point of waveform *a*. As a result, the phase comparator 40 produces a negative error voltage, as indicated with portion 96b of waveform *e*. Again, this signal is amplified and inverted in polarity to provide the proper voltage to the varactor VC through the integrator 88. As a result, a slightly less negative voltage waveform *g* portion 100b, is applied on line 92 to the varactor, resulting in an increased capacitance. This results in a corresponding decrease in the frequency of the resonant tank circuit 18, which shifts the reference signal waveform *a* to the right, so that if the data pulse 94 were present, it would occur with approximately exact phase quadrature relative to the number 4 zero crossover point. Consequently, the timing train pulses, appearing on the read clock output, line 15, derived from the numbers 3a and 4a zero crossover points of reference waveform *a* are 180° out-of-phase with the absent data train pulse 94c, as desired.

In this manner, the read clock 12 maintains a maximum separation between the data pulse of the data train and the pulses of the timing train output from the clock, notwithstanding the frequency and phase changes of the data train. Again, in response to the offset of synch pulse 94c, the slight change in the resonant frequency of the resonant tank circuit 18 results in a shift in the phase of the reference signal waveform, while the net reference signal frequency change is zero during the operating cycles responsive to synch pulse 94c and the absent data pulse 94d.

The operation of the system described with respect to the first pair of pulses 94a and 94b is repeated for the next pair of pulses 94e and 94f of the waveform *b* because they have the same timing offset.

Continuing on, the data train pulses 94f through 94i (waveform *b*) occur at the nominal operation frequency, as the distance between successive pulses is 400 nanoseconds. More importantly, the pulses are in exact phase quadrature with their respective crossover points (i.e. numbers 7, 8 and 9). Therefore, the phase comparator 40 produces no DC error voltage on the line 80 and the voltage on line 92 corresponds essentially to the nominal −6 volt reference level. Consequently, the resonant tank circuit 18 produces the sinusoidal reference signal of a nominal frequency.

Figure 2:
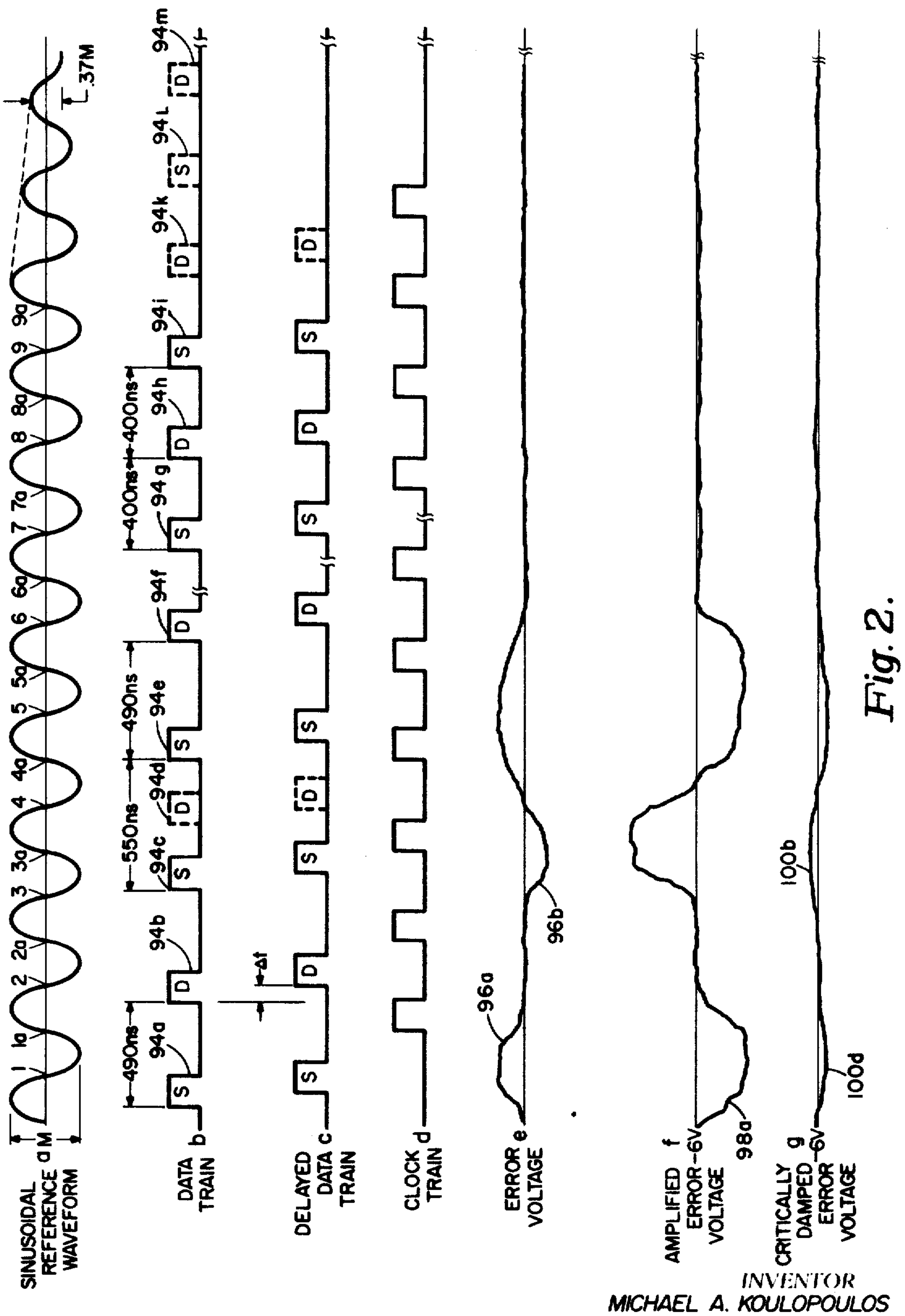
FIG. 2 is a set of timing diagrams illustrating operation of the FIG. 1 equipment.

Since the tank circuit 18 derives all of its energy from the input data train directly applied thereto, the absence of train results in the condition illustrated by the last three cycles of waveform *a* i.e. at the extreme right end in FIG. 2. Namely, the amplitude M of the sinusoidal reference waveform decreases when the tank circuit receives no synch or data pulses, i.e. when the data train pulses 94k, 94l and 94m are absent. As shown in FIG. 2, waveform *a*, the amplitude of the reference signal decreases to 37 percent of its original amplitude when there is such an absence of three successive synch and data pulses. As a consequence of this amplitude decrease, the detector 58 receives a similarly diminished data train and hence fails to produce timing pulses. Hence, the read clock 12 automatically inhibits the generation of further clocking pulses on its output line 15, as illustrated by the absence of a clock pulse at the right end of waveform *d*.

As just discussed, the absence of three successive synch and data pulses from the data train causes a decrease in the reference signal amplitude to the valve at which the timing train terminates for the illustrated read clock. However, this number can be altered by selecting the appropriate value of Q for the tank circuit 18. In the preferred embodiment, this selection is made as follows. The $Q$ of the tank is defined as $$Q=\frac{1}{2K} \quad (1)$$

where $K$ is a dampening factor expressed as:

$$K=\frac{1}{2R\text{ eq.}}\sqrt{\frac{L\text{ eq.}}{C\text{ eq.}}} \quad (2)$$

where $R$ eq., $L$ eq. and $C$ eq. are, respectively, a resistance, an inductance and a capacitance associated with the tank circuit as discussed hereinbelow.

Further, the period $T_0$ of the resonant frequency $f_0$ of the tank 18 is given by the expression $$T_0=2\pi\sqrt{(L\text{ eq.})(C\text{ eq.})} \quad (3)$$

The value for the dampening factor $K$ must be less than unity for the resonant tank circuit 18 to have an oscillatory response. Further, the output voltage of the resonant tank circuit 18 is proportional to $$e^{-2\pi KX} \quad (4)$$

$$X=\frac{t}{T_{0_i}} \quad (5)$$

The Q of the tank is that required for the circuit to ring (oscillate) for any given number N of cycles before the oscillating signal amplitude decreases to $1/e$ of its initial value. This occurs in the underdamped case when $$2\pi K(t/T_0)=1. \quad (6)$$

Consequently, $$Q=\pi N. \quad (7)$$

Since the number $N$ of cycles corresponds to three in the illustrated construction, $Q$ is calculated from the aforementioned expression. From this value of $Q$, the dampening factor $K$ may be calculated and from this value the specific values for $R$ eq., $L$ eq. and $C$ eq. are calculated.

In particular, the resistance R eq. corresponds to the input impedance of the emitter follower stage 42 is seen by the tank circuit through coupling capacitor 41. The values for L eq. and C eq. are defined by the resonant frequency of the tank 18, and hence the resistance R eq. may be readily calculated. In the illustrated embodiment, $L$ eq. = 44 microhenries, $C$ eq. = 90 micromicrofarads, and $R$ eq. = 9 kilohms. The total inductance L eq. is that of the inductors 24 and 26, while the capacitance C corresponds to the parallel combination of the varactor capacitance and the capacitance of capacitor 28. However, since the capacitance of capacitor 28 is large in comparison with the capacitance of the varactor, it usually may be disregarded. For similar reasons, the capacitance of capacitor 41 may also be discarded. However, the capacitance C eq. also includes stray or distributed capacitance measured between the junction 20 and the ground of FIG. 1.

In summary, the Q of the tank 18 can be selected such that the read clock 12 automatically inhibits the generation of a clocking output on the line 15 in the absence of a successive number of pulses from the input data train. In practice, this is accomplished by the selection of the resistors 50 and 51 for the emitter follower stage 42. For further details relative to the derivation of the above equations, reference may be made to pages 59—61 of the aforementioned text titled "Pulse, Digital, and Switching Waveforms."

A further feature of the invention, and derived from directly applying the pulses of the data train to the tank 18, is the ability of the read clock 12 to inhibit the generation of a clocking pulse when the phase discrepancy between the reference signal and data train exceeds a maximum displacement. Specifically, so long as a quadrature relationship is maintained, the application of pulses to tank 18 does not disturb the natural frequency. On the other hand, when the pulses are displaced from the zero-crossing points, the data train energy applied to the tank circuit is improperly phased. This dampens the oscillation of the tank 18. As a consequence, the read clock 12 automatically stops generating the timing train.

As pointed out earlier, the frequency and phase of the reference signal are corrected at a critically damped rate in accordance with the error voltage produced by the comparator 40. The period of the reference signal is corrected by a percentage ($\alpha$) of the error voltage generated during a comparison. Similarly, the phase is corrected by a percentage ($\beta$) in accordance with the same error voltage. The evaluation of these percentages is based upon reaching a zero error state within a specified number of pulses. The evaluation is made under worst case conditions, specifically considering the maximum acceptable error and the maximum variation in the frequency and phase of the reference signal. In the illustrated embodiment the values of 2.4 percent for $\alpha$ and 28.8 percent for $\beta$ were found to provide satisfactory results.

It may be shown that since the error varies as an exponential exhibiting critically damped behavior, the error function in equation form corresponds to the expression:

$$e_r(K_n) = (C_1 + K_n C_2) e^{-\gamma K_n} \qquad (8)$$

where $C_1$ is a coefficient for phase, $C_2$ is a coefficient for frequency, and $\gamma$ is related to $\alpha$ and equals $$\ln (1 - \sqrt{\alpha}) \qquad (9)$$

Further, the term $e_r (K_n)$ defines the error at some pulse $K_n$ while the coefficient $C_1$ and $C_2$ define the phase and frequency error respectively which becomes zero after $K_n$ number of pulses. The coefficient $C_1$ is evaluated under initial conditions (i.e. when $n=0$ and the error $e_r (K_n) = 0.5$, or 180°). From the above expressions of $e_r (K_n)$, $C_1$ calculates to $-0.5$ wherein the minus sign designates the direction of error. Although the maximum phase shift may only approximate 28 percent, the subject invention is capable of accommodating phase displacements of up to 50 percent (i.e. where $e_r (K_n)=0.5$). The coefficient $C_2$ is evaluated where the error decreases to zero within a predetermined number of pulses. In the preferred embodiment this number is selected to be 15. Since $e^{1\ K}$ can never equal zero, $C_2$ must equal $-C1/Kn$ when solving for $C_2$ in expression (8). The expression for $e_r (K_n)$ now comes $$(-0.5 + K_n 0.033) e^{-\gamma K_n} \qquad (10)$$

where $n=15$.

Different values of $\gamma$ may be calculated by substituting values for $\alpha$ into expression (9).

By utilizing the value of $\gamma$ in selecting the time constant for the integrator 88, the critically damped rate of correction is attained. Specifically, the correction voltage applied to line 92 of FIG. 1 (i.e. voltage output of the integrator 88) takes the form of the expression: $E_g = E_f (1 - e^{1t/RC})$ (11) where $E_g$ and $E_f$ are the amplitudes of waveforms $g$ and $f$ respectively in FIG. 2. By equating $\gamma$ to the exponent $t$/RC (where R is the value of resistor 90 and C the value of capacitor 30), the desired exponential rate of correction is obtained. In the illustrative embodiment, $t$ corresponds to the time it takes the error $e_r (K_n)$ to decrease from a maximum value of ±0.5 to a zero error with $\gamma$ having a value of 0.168. This interval $t$ is given by the nominal period of the pulse train multiplied by the number of pulses (i.e. 400 nanoseconds . 15). Since capacitance, C, corresponds to the value selected for the capacitor 30, the resistance R for resistor 90 is selected in accordance with the expression $t/RC = \gamma$.

By way of illustration, the components selected for the tank 18, the integrator 88, and the emitter follower stage 42 of the illustrated embodiment for achieving a critically damped rate of correction for both frequency and phase of the resonant tank 18 within 15 pulses in addition to automatically inhibiting the clock output during the absence of 3 pulses are listed in the table below.

TABLE

Inductor 24—39 microhenries.
Variable inductor 26—3.5–9.0 microhenries.
Capacitor 28—5.1 picafarads.
Varactor VC—TWR 4815A.
Capacitor 30—.001 microfarads.
Resistor 90—36 kilohms.
Capacitor 41—100 picafarads.
Resistor 46—1.3 kilohms.
Resistor 50—82 kilohms.
Resistor 51—15 kilohms.

In summary, the invention provides a novel data train excited read clock with the above-described features of automatic inhibiting of the timing train in the absence of either a predetermined number of input data train pulses or a maximum phase discrepancy. These features are included within the clock without increasing the complexity thereof.

In practice, the invention can be used with changes from the illustrated embodiment. For example, other types of amplifiers and matching circuits can be employed, the polarities of voltage sources and transistors may be changed. Further, other forms of phase comparison circuits may be utilized, in addition to other forms of resonant circuits to produce a periodic symmetrical reference signal.

While in accordance with the provisions and statutes it has been illustrated and described the best form of the invention known, certain changes may be made in the circuitry described without departing from the spirit of the invention as set forth in the appended claims and that in some cases certain features of the invention may be used to advantage without a corresponding use of other features.

Having described the invention, what I claim as new and novel for which it is desired to secure Letters Patent is:

1. A method for generating timing train for recovering information from an input data train consisting of data and synch pulses in which information is encoded as the presence or absence of a pulse between regularly occurring synch pulses and wherein the pulses of said data train are subject to phase and frequency deviations, said method comprising the steps of:

1. generating a symmetrical sinusoidal reference signal including a plurality of reference points directly from a tank circuit periodically pulsed by said input data train pulses;
2. comparing the phase between the derived reference signal and each of the pulses of said data train at predetermined ones of said reference points and deriving an error signal proportional to differences in phase therebetween;
3. adjusting at a predetermined rate the frequency of the reference signal in accordance with said error signal to establish a predetermined phase relationship between said reference signal and said input data train pulses;
4. delaying the input data train to align the leading edge of said pulses with said predetermined ones of said reference points; and
5. deriving from said reference signal said timing train from different ones of said reference points alternately to said predetermined ones for maintaining maximum separation between the data and synch pulses of said input data train and said timing train pulses for facilitating subsequent recovering of information signals from said data train.

2. A method for generating timing train for recovering information from an input data train having data and synch pulses encoded as the presence or absence of a pulse between regularly occurring synch pulses and wherein the pulses and wherein the pulses of said data train are subject to large phase deviations and slight frequency deviations, said method comprising the steps of:

1. generating a symmetrical periodic reference signal directly from a tank circuit periodically pulsed by said data train;

2. comparing the phase between the derived symmetrical periodic reference signal and each of the pulses of said input data to derive an error signal proportional to the differences in phase therebetween;
3. adjusting at a predetermined exponential rate the phase of the reference signal in accordance with said error signal, said rate being selected to establish a phase quadrature relationship between the pulses of the data train and said period reference signal and,
4. deriving from predetermined points of said reference signal pulses of said timing train with maximum out of phase relationship to the pulses of said input data train for facilitating recovery of information therefrom.

3. An apparatus for generating a timing train for facilitating the recovery of information from an input data pulse train consisting of data and synch pulses derived from signals recorded in random access memory using a double recording technique, said apparatus comprising:

a normally inactive low Q resonant tank circuit means connected to be driven by said pulses for generating a periodic sinusoidal reference signal including alternately occurring first and second sets of reference points;

phase error generating means connected to generate an error voltage having a magnitude proportional to the difference in phase between each of the pulses of said data pulse train and said reference signal;

integrating means connected with said error generating means and to said resonant circuit means, said integrating means responsive to said error voltage to generate a correction bias voltage for adjusting at a predetermined rate the frequency of said resonant tank circuit means to establish a phase quadrature relationship between the pulses of said data train and said reference signal;

delay means for delaying by a predetermined amount said data pulse train for aligning the leading edges of the pulses of said data pulse train to coincide said sets of alternating occurring reference points of said reference signal; and level switching and pulse generating means for deriving from said second sets of alternately occurring reference points of said reference signal, the pulses of said timing pulse train with a predetermined phase relationship to said data train.

4. The apparatus of claim 3 wherein said integrating means consists of serially connected resistive capacitive elements connected to provide a time constant for producing a magnitude of correction voltage whose rate of change adjusts said frequency of said resonant tank circuit means to establish said phase quadrature relationship at a critically damped rate.

5. The apparatus of claim 3 wherein said phase error generating means includes phase comparator means connected to receive the pulses of said data train and said sinusoidal reference signal respectively; and amplifier means connected in series with said phase comparator means and said integrating means, said amplifier means connected to apply to said integrating means in the absence of an error voltage, a reference voltage of a predetermined magnitude and polarity for conditioning said resonant tank circuit means to generate said sinusoidal signal at a nominal frequency and being further adapted to vary magnitude of said reference voltage in accordance with said error voltage.

6. The apparatus of claim 3 wherein said resonant circuit means consists of a parallel resonant tank circuit whose nominal resonant frequency corresponds to the frequency of data pulses, said parallel resonant tank circuit including a volt-age-variable capacitor means, said capacitor means connected to receive said correction bias voltage for changing the capacitance thereof and adjusting the frequency of said resonant circuit means at a critically damped rate.

7. Apparatus of claim 3 wherein said resonant circuit means includes resistive capacitive and inductive elements, said elements elected to provide said Q for decreasing the amplitude of said sinusoidal reference signal upon the absence of a successive predetermined number of pulses in said data train to a magnitude sufficient to inhibit said level switching and pulse generating means from deriving further pulses of said timing train from said reference points of said sinusoidal reference signal.

8. Read clock apparatus for use in a magnetic memory system for facilitating detection of information contained in a data train derived from double frequency recorded binary signals which include a synch data bit at the beginning of each interval and a data bit substantially in the midpoint of each interval wherein such synch bits and data bits are subject to both frequency and phase shift, said read clock apparatus comprising;

normally inactive oscillatory means included within said read clock for generating in response to pulses of said data train applied from said memory system a symmetrical periodic reference signal including a number of reference points;

error signal generating and correcting means coupled to said normally inactive oscillatory means for producing an error signal whose magnitude is proportional to the phase displacement between said pulses of said data train relative to predetermined ones of said reference points, said error signal generating and correction means connected to apply an error signal voltage to said oscillatory means to adjust the frequency thereof whereby said phase displacement is decreased at a predetermined exponential rate;

delay means for delaying said data train a predetermined amount for aligning the pulses thereof with said predetermined ones of said reference points of said reference signal; and level switching and pulse generating means for deriving an output timing train from alternate points of said reference signal.

9. A read clock apparatus for generating a timing pulse train for recovery of information of an encoded input data train derived from double frequency recorded binary signals received from an random access memory means wherein said data train is preceded by a predetermined number of pulses for synchronizing said read clock apparatus with said data train, said read clock apparatus comprising;

means for reshaping the pulses of said data train;

a normally inactive resonant tank circuit means including a voltage frequency sensitive element, said resonant tank circuit means coupled to said reshaping means and operative in response to the pulses of said data train to generate a periodic symmetrical reference signal including a plurality of crossover points;

error generating and correction means connected to receive said reshaped data train and said periodic reference signal, said error generating and correction means including phase comparator means for generating an error voltage whose magnitude is proportional to the difference in phase between each of the pulses of said pulse train and said reference signal and integrating means connected with said phase comparator means, said integrating means connected to generate in response to said error voltage a correction voltage for application to said voltage frequency sensitive element for varying the frequency of said resonant tank circuit means at a rate for minimizing the number of synchronizing pulses required to synchronize said read clock apparatus;

impedance matching means connected to said resonant tank circuit means, the impedance of said impedance matching means in parallel with the frequency elements of said resonant tank circuit means selected to provide a predetermined circuit Q;

delay means connected to said reshaping means for delaying said data train to align said data train to coincide with predetermined ones of said crossover points; and level switching and pulse generating means connected to said impedance means for receiving said periodic reference signal, said level switching and pulse generating means operative to derive from different ones of said crossover points said timing pulse train.